United States Patent
Hughes (10) Patent No.: US 9,560,030 B2
(45) Date of Patent: Jan. 31, 2017

(54) NODAL RANDOM AUTHENTICATION

(71) Applicant: Kaiser Foundation Hospitals, Oakland, CA (US)

(72) Inventor: Alexander Z. Hughes, Piedmont, CA (US)

(73) Assignee: Kaiser Foundation Hospitals, Oakland, CA (US)

( * ) Notice: Subject to any disclaimer, the term of this patent is extended or adjusted under 35 U.S.C. 154(b) by 133 days.

(21) Appl. No.: 14/536,334

(22) Filed: Nov. 7, 2014

(65) Prior Publication Data

US 2016/0134608 A1    May 12, 2016

(51) Int. Cl.
G06F 21/00    (2013.01)
H04L 29/06    (2006.01)
G06F 21/31    (2013.01)

(52) U.S. Cl.
CPC .............. *H04L 63/08* (2013.01); *G06F 21/31* (2013.01); *H04L 63/102* (2013.01); *G06F 2221/2139* (2013.01)

(58) Field of Classification Search
USPC .......................................................... 726/5
See application file for complete search history.

(56) References Cited

U.S. PATENT DOCUMENTS

| | | | |
|---|---|---|---|
| 6,595,856 B1 | 7/2003 | Ginsburg et al. | |
| 7,062,470 B2 | 6/2006 | Prasad et al. | |
| 7,328,455 B2 | 2/2008 | Jutzi et al. | |
| 7,340,773 B2 | 3/2008 | Edwards | |
| 7,624,437 B1 * | 11/2009 | Fagundo | H04L 12/4641 713/153 |
| 7,849,321 B2 | 12/2010 | Mizrah | |
| 8,006,300 B2 | 8/2011 | Mizrah | |
| 8,316,237 B1 | 11/2012 | Felsher et al. | |
| 8,433,914 B1 | 4/2013 | Philpott et al. | |
| 8,478,688 B1 | 7/2013 | Villa et al. | |
| 8,549,301 B2 | 10/2013 | Tornqvist | |
| 8,572,391 B2 | 10/2013 | Golan et al. | |
| 8,584,219 B1 | 11/2013 | Toole et al. | |
| 8,635,662 B2 | 1/2014 | Lang | |
| 2005/0097320 A1 | 5/2005 | Golan et al. | |
| 2006/0095763 A1 * | 5/2006 | Iyengar | H04L 9/3236 713/167 |
| 2007/0250923 A1 | 10/2007 | M'Raihi | |
| 2008/0222368 A1 | 9/2008 | Gehrmann | |

(Continued)

FOREIGN PATENT DOCUMENTS

| | | |
|---|---|---|
| WO | WO 99/64995 A1 | 12/1999 |
| WO | WO 01/11817 A2 | 2/2001 |
| WO | WO 2013/142802 A1 | 9/2013 |

OTHER PUBLICATIONS

U.S. Appl. No. 14/536,353, filed Nov. 7, 2014, Hughes.

(Continued)

*Primary Examiner* — Jason Lee
(74) *Attorney, Agent, or Firm* — Mauriel Kapouytian Woods LLP; Elaine Lee; Michael Mauriel (57) ABSTRACT

Systems, methods, and computer program products related to transaction application security are disclosed. In a particular embodiment, application nodes are randomly selected for requiring re-authentication of a user traversing nodes of the application. These and other embodiments are more fully disclosed herein.

16 Claims, 7 Drawing Sheets

(56) References Cited

U.S. PATENT DOCUMENTS

| | | |
|---|---|---|
| 2008/0263652 A1 | 10/2008 | McMurtry et al. |
| 2008/0301784 A1* | 12/2008 | Zhu .................... H04L 63/0823 726/5 |
| 2011/0087888 A1 | 4/2011 | Rennie |
| 2011/0092185 A1* | 4/2011 | Garskof .................. G06F 21/35 455/411 |
| 2011/0258452 A1 | 10/2011 | Coulier et al. |
| 2012/0089742 A1* | 4/2012 | Jagannatharao .... H04L 12/4641 709/229 |
| 2012/0196674 A1 | 8/2012 | Gazdic et al. |
| 2013/0167211 A1 | 6/2013 | Kamat |
| 2013/0268753 A1 | 10/2013 | Vanderpol et al. |

OTHER PUBLICATIONS

Sanchez et al., "Implementing Signatures for Transactional Memory," 40th Annual IEEE/ACM Symposium on Microarchitecture (MICRO-40), 2007, pp. 1-11.
"CitiBusiness Online Token Reference Guide," CitiBank, 2011, pp. 1-5.

* cited by examiner

NODAL RANDOM AUTHENTICATION

CROSS REFERENCE TO RELATED APPLICATIONS

The subject matter of this application is related to the subject matter of a U.S. patent application titled "Device Notarization" by the same inventor, filed on the same date herewith, and identified by Ser. No. 14/536,353. The entire disclosure of that application is hereby incorporated by reference.

BACKGROUND

The disclosure relates generally to authentication, and more particularly, to systems and methods for use in authenticating a user of a transaction application.

In transaction processing, a critical issue is authentication—how does a service or transaction provider know whether a certain user accessing a service and performing actions at a certain site is who the user claims to be. In many instances, the conventional method of using the combination of a login and password alone may not be satisfactory. Many solutions have been proposed for the problem of authentication, however many of them encounter an imbalance between usability vs. security—they are either not secure enough, or, when security is enhanced to satisfactory levels, they are cumbersome and expensive to deploy and operate.

Therefore, a need exists for an authentication system and method that overcomes the disadvantages described above with conventional authentication systems and methods.

SUMMARY

Many attacks on client-server transaction applications involve automated malware. Such programs rely on predictability in client-server interactions. One area of predictability that can be exploited by such programs is the identification of the nodes at which a particular transaction application will require authentication. Typically authentication is required at the entry point (e.g., an initial login) to the application and, in some applications, additional authentication (which may involve requiring the user to re-enter the login credentials or enter other credentials) is required before authorizing certain types of transactions (e.g., payments, prescriptions, or other sensitive transactions). Such predictable patterns can be exploited by attackers that design malware to automatically attack an application to obtain improper access to transaction capabilities.

In one embodiment of the present invention, an authentication module randomly selects one or more particular nodes of an application for re-authentication. In one embodiment, nodes are weighted randomly after a user login event. In one embodiment, weighting is binary such that the weight value assigned to a particular node indicates that the particular node is either selected or not selected for re-authentication based on the weight of that node only. In another embodiment, weight values are some fraction of a threshold value and re-authentication of a user is only required if the cumulative total weight of nodes traversed by the user equals or exceeds the threshold value. In some embodiments, an authentication module selects one or more particular nodes for re-authentication based on current risk factors. In some embodiments, the authentication module nodes are weighted based on risk factors. In some embodiments, risk-factor weighting is binary such that the weight value assigned to a particular node indicates that the particular node is either selected or not selected for re-authentication based only on the weight of that node. In another embodiment, risk-factor weight values are some fraction of a threshold value and re-authentication of a user is only required if the cumulative total weight of nodes traversed by the user exceeds the threshold value. These and other embodiments are more fully described herein.

BRIEF DESCRIPTION OF THE DRAWINGS

By way of example, reference will now be made to the accompanying drawings, which are not to scale.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). However, in a particular embodiment, computer readable storage medium is a non-transitory computer readable medium (e.g., persistent (i.e., non-volatile) storage, volatile memory (e.g., random access memory), or various other well-known non-transitory computer readable mediums). Further, computer instruction signals may be embodied in a transmission medium (with or without a carrier wave upon which the signals are modulated). For example, the transmission medium may include a communications network, such as the Internet.

In some embodiments, a method of enabling a transaction initiated by a user of a client application having a plurality of nodes is described. An authentication server authenticates the user based on user input received at login and randomly determines whether to re-authenticate the user, e.g., using a random selection, at particular nodes of the application. Further, in some embodiments, in response to authenticating the user based on user input received at login, the authentication server allocates weights to each node of at least a subset of nodes of the client application, and subsequent to the allocation, at each traversed node of the subset of nodes, determines whether to re-authenticate the user using the weight assigned to the respective node. Allocating weights to each node of the client application is done randomly and/or based on a risk level for each node, which may be based on market conditions and/or user attributes. The term "market conditions" is simply a label to refer to various external factors that might affect the risk level of attack on the transaction application. At a subsequent authenticated user login, authentication server re-allocates the weights to each node of the client application.

Figure 1:
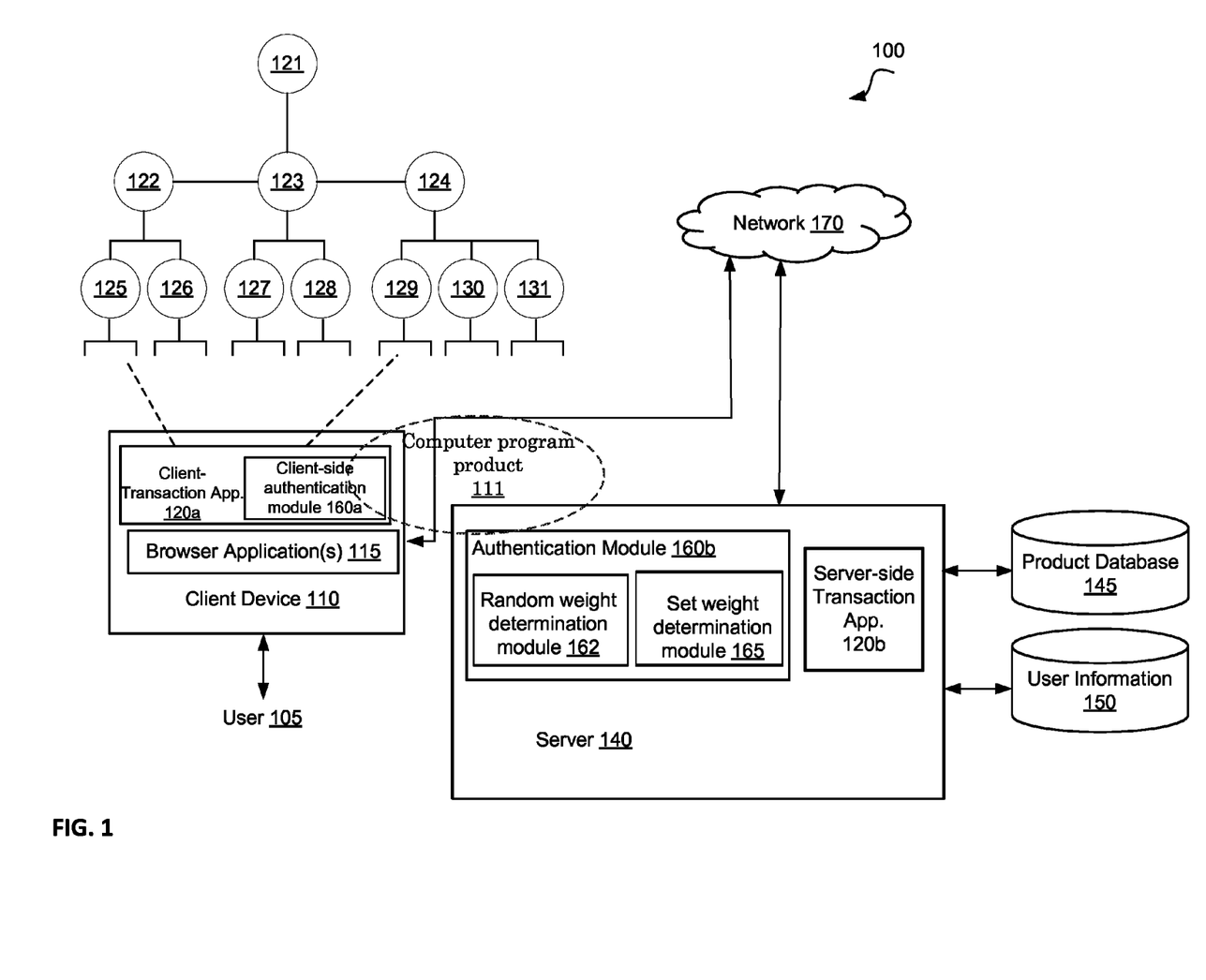
FIG. 1 is a diagram of a computer system in the context of a computer network, the computer system being in accordance with one embodiment of the present invention.

FIG. 1 illustrates an authentication system 100 according an embodiment of the present invention. System 100 includes a client device 110 and server 140 in communication over a network 170 and configured by computer program product 111. In the illustration of FIG. 1, a portion of computer program product resides on client device 110 and a portion resides on server 140. However, computer program product 111 is represented in composite fashion for ease of illustration only. In particular implementations, a computer program product residing on client device 110 is distinguishable from a computer program product residing on server 140; however, either one alone, or both together may be relevant to particular embodiments or aspects of the present invention. A user 105, such as a retail consumer, a medical patient, or a medical provider utilizes client device 110 to initiate a transaction with server 140. Note that transaction, as used herein, refers to any suitable action performed using client device 110, including payments, transfer of information, display of information, new user registration, requesting a prescription, filling a prescription, etc.

Client device 110 and server 140 may each include one or more processors, memories, and other appropriate components for executing instructions such as program code in computer program product 111 stored on one or more computer readable mediums to implement the various applications, data, and steps described herein. For example, such instructions may be stored in one or more computer readable media such as memories or data storage devices internal and/or external to various components of system 100, and/or accessible over network 170. Authentication server 140 communicates with one or more client devices 110 via network 170 and may employ protocols such as Internet protocol suite (TCP/IP), Hypertext Transfer Protocol (HTTP) or HTTPS, instant-messaging protocols, or other protocols.

Network 170 may be implemented as a single network or a combination of multiple networks. For example, in various embodiments, network 170 may include the Internet or one or more intranets, landline networks, cellular networks, wireless networks, and/or other appropriate types of networks.

Client device 110 may be implemented using any appropriate hardware and software configured for wired and/or wireless communication over network 170. For example, in one embodiment, client device 110 may be implemented as a personal computer (PC), a tablet, personal digital assistant (PDA), laptop computer, a smart phone, an automated teller machine, and/or other types of computing devices capable of transmitting and/or receiving data over network 170.

Client device 110 may store (e.g., in memory) one or more client applications, such as browser application 115 and a client transaction application 120a. Browser application 115 may be used, for example, to provide a convenient interface to permit a user to browse information available over network 170. For example, in one embodiment, browser application 115 may be implemented as a web browser configured to view information available over the Internet. Client transaction application 120a, in one embodiment, may be provided by server 140 (e.g., may be downloaded to client device 110) and may be used, for example, to provide client-side processing for performing desired tasks in response to operations selected by a user.

For example, with respect to financial transactions, client transaction application 120a may be a payment application configured to display a user interface in connection with a financial transaction initiated by a user. As another example, in the health care environment, client transaction application 120a may be configured to display a user interface in connection with a medical transaction initiated by a user. For example, the medical transaction may involve a patient looking up test results, a patient requesting prescriptions, a doctor filling prescriptions, and so on.

In the embodiment shown, client side transaction application 120a includes client-side authentication module 160a. In one embodiment, client-side authentication module 160a provides device-generated authentication credentials when required by server-side authentication module 160b in order to gain access to a particular node of client-side transaction application 120a and/or server-side transaction application 120b.

As illustrated in FIG. 1, an access structure of client transaction application 120 comprises a plurality of nodes in a hierarchical or tree structure. After successfully logging into client transaction application 120, a user gains access to entry point 121 and can traverse one or more nodes 122-131 (and any leaves of these nodes) of client transaction application 120. While FIG. 1 only illustrates a two-level hierarchy for ease of illustration, it can be understood that the hierarchy can be multi-level deep and may have a more complex or a simpler structure than that illustrated in FIG. 1. Further, while client application 120 may include nodes 122-131, only a subset of those nodes (say, nodes 122-128) may be available for access to particular user, depending on the user's eligibility. For instance, in the case of system 100 implementing a medical records system, a patient user may have access to node 122 (reviewing a medical bill) and node 123 (requesting a prescription), while a doctor user may have access to node 122 (reviewing a medical bill) and node 124 (fulfilling a prescription). In other words, the access structure illustrated in FIG. 1 for client application 120 may appear differently for different users.

Server 140 includes a server-side authentication module 160b configured to authenticate a user attempting to access client transaction application 120a. In some embodiments, authentication module 160b may authenticate a client device 110 so that client device 110 may access resources such as resources stored in a product database 145. For instance, in case of system 100 providing a medical records system, product database 145 may store medical records. Operation of authentication module 160b is discussed further with reference to FIGS. 2-4. While not illustrated as such in FIG. 1, product database 145 may be in communication or otherwise accessible to server 140 over a network, such as network 170. In some embodiments, product database 145 is maintained by a third party server (not shown in FIG. 1). Accordingly, authentication module 160b enables a client transaction application 120a to initiate, maintain and participate in a transaction with server 140, and/or a third party server (not shown in FIG. 1).

In the illustrated embodiment, authentication module 160b includes a random weight determination module 162 and a set weight determination module 165 for determining and storing respective weights associated with nodes 122-131 of client transaction application 120a. In some embodiments, weight determination modules 162 and/or 165 dynamically determine a weight associated with at least a subset of nodes 122-131 of client transaction application 120a each time user logs onto client transaction application 120a. Random weight determination module 162 can be implemented as a typical random number generator and may be configured to generate binary weights (e.g., either 0 or a threshold value of, for example, 1) or fractional weights, for example corresponding to a number equal to or between a minimum value (e.g., 0) and a threshold value (e.g., 1). Operation of set weight determination module 165 is discussed further with reference to FIGS. 3A-C.

In the embodiment illustrated in FIG. 1, relevant nodes are shown for client-transaction application 120a. However, in alternative embodiments, some or all relevant application nodes navigated by a user may reside in a server-side transaction application (similar to server-side transaction application 120b) accessed through a client-side component specifically designed for navigating the server side application or through a browser application (e.g., browser application 115) and/or a specific browser extension or add-on designed for interacting with the relevant server side transaction application.

Figure 2:
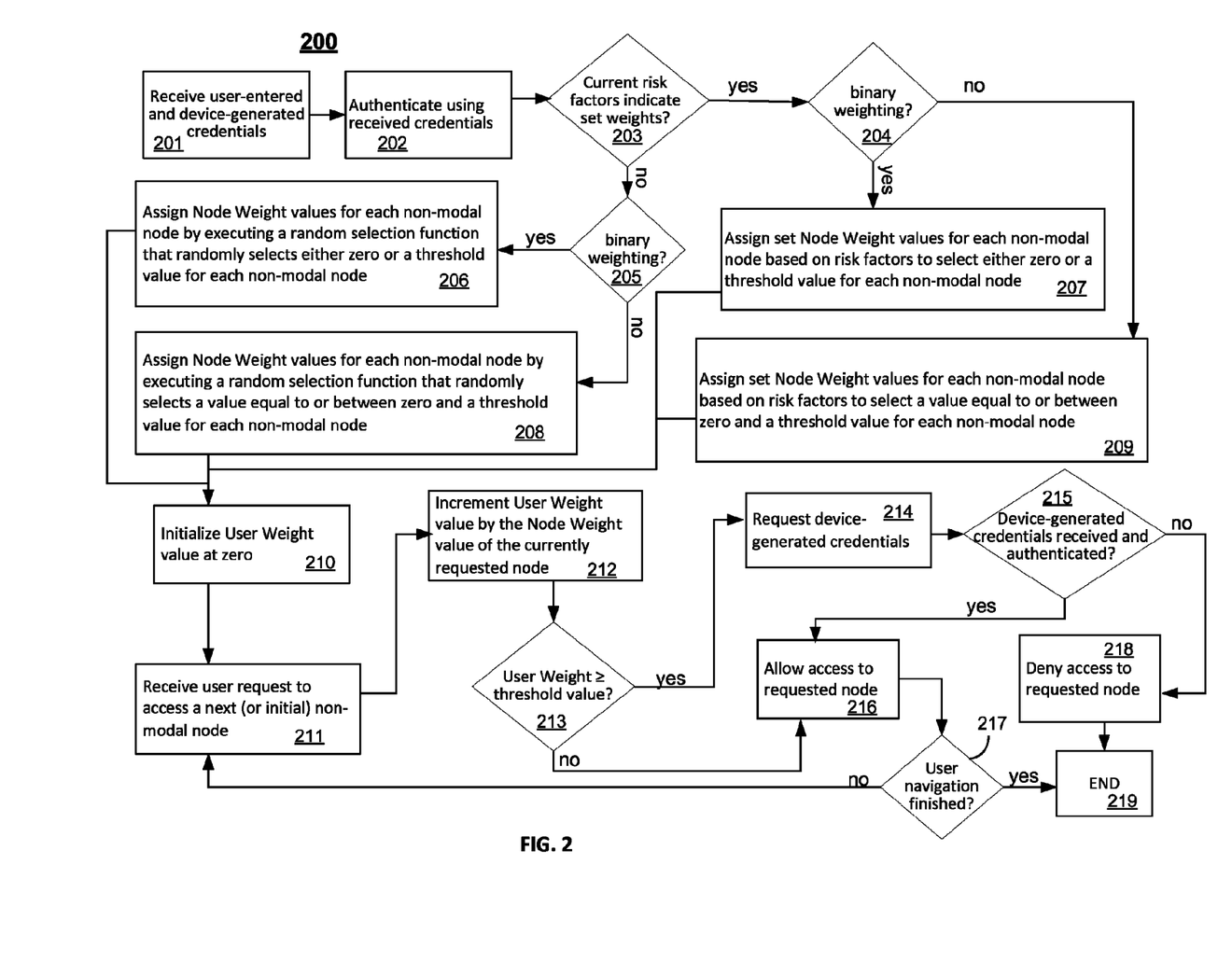
FIG. 2 is a process flow diagram illustrating a method for operation of an authentication module shown in FIG. 1 to authenticate a user according to some embodiments of the present invention.

FIG. 2 is a process flow diagram illustrating a method 200 for operation of authentication module 160b on server 140 to authenticate a user (corresponding to client device 110 and client transaction application 120a executing on client device 110) according to some embodiments of the present invention.

Step 201 receives user-entered and device-generated credentials from client device 110. In one embodiment, user-entered credentials comprise typical login credentials such as a user name and a shared secret such as a password. In one embodiment, device-generated credentials comprise an authentication value generated by client-side authentication module 160a executing a function, e.g., a hash function, using various input values. The input values may include user credentials, application-specific values, devices values, and/or other values. In some embodiments, the device-generated credentials might be generated using typical inputs and functions associated with transaction data signatures. In some embodiments the device-generated credentials might be generated using techniques shown and described in applicant's co-pending application titled "Device Notarization" by the same inventor and filed on the same date herewith, the entire disclosure of which has been incorporated by reference into the present application.

Step 202 determines if the user should be authenticated based on the received credentials. Assuming that the user is successfully authenticated upon initial login, method 200 proceeds to step 203 to determine whether current risk factors indicate set weights. This can be determined based on an administrator setting or it can be determined based on a risk assessment application (not separately shown) that automatically assesses various factors to determine whether heightened risks require that certain non-modal nodes be subject to additional authentication steps.

As used herein, the term "non-modal node" simply means a node that would not typically require additional authentication. In other words, in a given transaction application, certain nodes may, in some embodiments, be deemed sensitive enough to always require a particular mode of authentication or re-authentication (e.g., a node for prescribing certain drugs that are designated as high risk and/or subject to potential abuse, e.g., narcotics). Such nodes are considered "modal" simply because, for the given application, those nodes require a particular mode of authentication no matter what. An example of a modal node is one in which a prescription is ordered (a node with high risk of attack), which might require use of a transaction data signature mode of authentication. In contrast, a non-modal node is one in which a specific mode of authentication is not required but which may be dynamically selected for requiring that the user be re-authenticated by authentication module 160b. An example of a non-modal may include a node preceding (i) the prescription node and (ii) a read-only vitals node. Such a node has an ambiguous level of risk as it can lead either to the prescription node (high risk) or to the read-only vitals (low risk). Therefore, no specific mode of authentication may be consistently required, and an authentication mode may be dynamically selected by authentication module 160b, e.g., in real-time or quasi-real time (e.g., after login but prior to a request to access a particular node), For such non-modal nodes, authentication may or may not be required depending on administrator selection, risk assessment application warnings, and/or random selection.

If the result of step 203 is yes, then step 204 determines whether binary weighting applies. If yes, then step 207 assigns set weight values for Node Weight (a defined variable having a value for each node corresponding to the assigned weight for that node) of either zero or a threshold value (e.g., 1) for each non-modal node based on current risk factors. If the result of step 204 is no, then step 209 assigns set values for Node Weight to each non-modal node that is equal to or between zero and a threshold value for each non-modal node.

If the result of step 203 is no, then node weight values will be assigned using a random selection function. Step 205 determines if binary weighting will apply. If yes, then step 206 assigns a value for Node Weight to each non-modal node by executing a random selection function that selects between zero and a threshold value to be assigned to each node. If the result of step 205 is yes, then step 208 assigns Node Weight values for each node by executing a random selection function that selects a value equal to or between zero and a threshold value to be assigned to each node. The number of possible values between zero and the threshold value may be different in different embodiments. For example, in one embodiment, any tenth of a threshold value may be selected (e.g., 0.1, 0.2, 0.3, etc.). In another embodiment, any quarter value of a threshold value may be selected (e.g., 0.25, 0.5, 0.75, etc.).

After either of steps 206, 208, 207, or 209 are completed, the method proceeds to step 210. Step 210 initializes a variable labelled "User Weight" at zero. This value will be incremented depending on the weight assigned to each node as the user navigates through various nodes of the application. Step 211 receives a user request to access an initial or next non-modal node. Step 212 increments the value of User Weight by the value of Node Weight for the currently requested node. Step 213 then determines whether User Weight is greater than or equal to the threshold value. If no, then the method proceeds to step 217. If user navigation is finished, then the process ends at 219. If not, then the process returns to step 211 as the user traverses additional nodes.

If the result of step 213 is yes, then step 214 requests device-generated credentials. In one embodiment, device-generated credentials comprise an authentication value generated by client-side authentication module 160a executing a function, e.g., a hash function, using various input values. The input values may include user credentials, application-specific values, devices values, and/or other values. In some embodiments, the device-generated credentials might be generated using typical inputs and functions associated with transaction data signatures. In some embodiments, the device-generated credentials might be generated using techniques shown and described in applicant's co-pending application entitled "Device Notarization" by the same inventor and filed on the same date herewith, the entire disclosure of which has been incorporated by reference into the present application. In a preferred embodiment, credentials for re-authentication when Node Weight is equal to or greater than a threshold value are generated without requiring additional input for the user and the re-authentication is therefore not necessarily noticeable by the user. In alternative embodiments, the user might be prompted to enter credentials that are used for re-authentication.

Step 215 determines whether the device generated credentials have been received and authenticated. If yes, then the method proceeds to step 216 and the user is allowed access to the requested node. If no, then the method proceeds to step 218 and access is denied to the requested node and, in the illustrated embodiment, the method ends at step 219 and the user is denied any further access to the application.

Figure 3A:
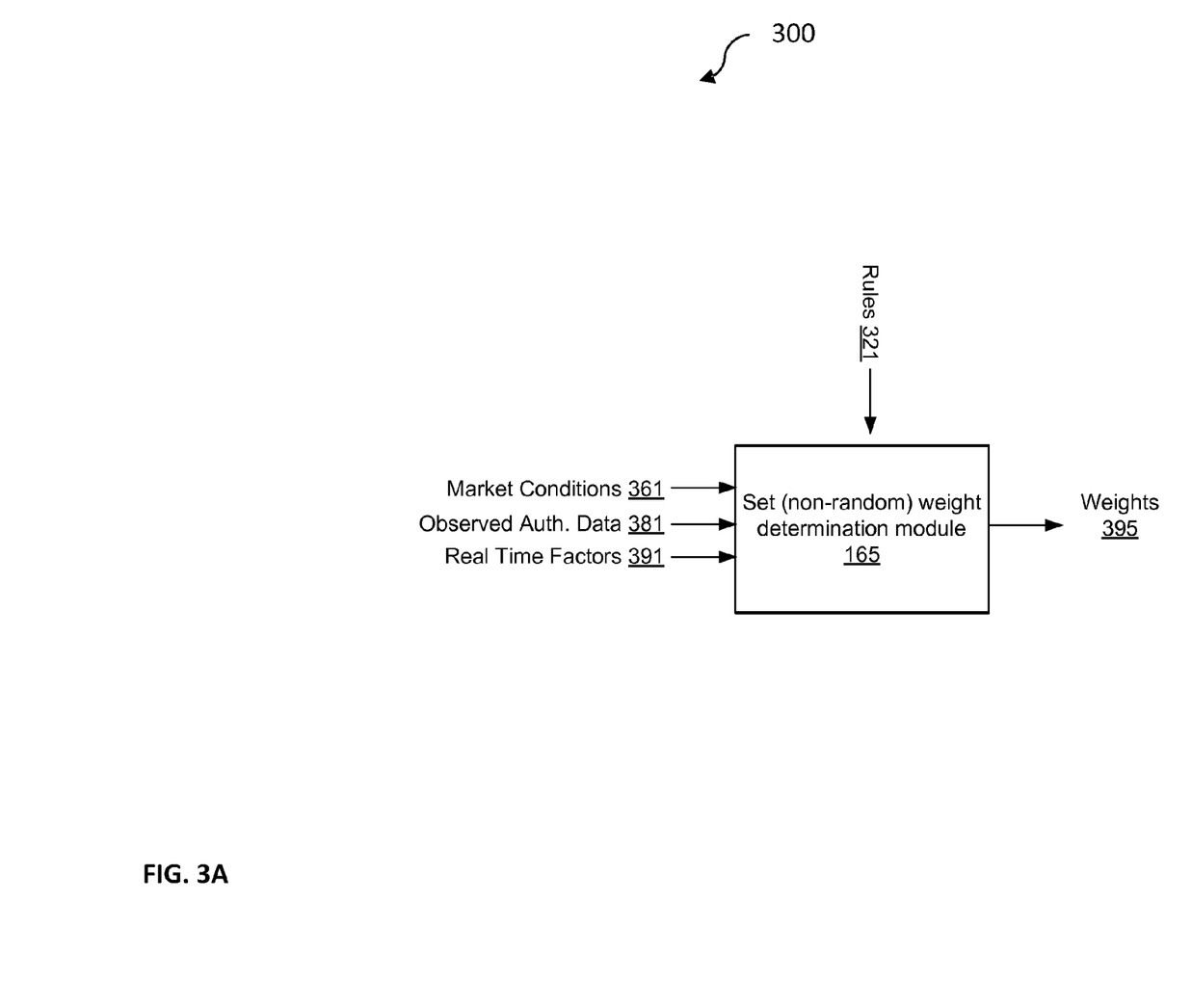
FIG. 3A is a block diagram illustrating operation of the set weight determination module shown in FIG. 1.

Note that assignment of set weights (not random) may be done based on an administrative user selection or may be done through an automated process. The operation of an automated set weight determination module is further described in the context of FIG. 3.

In the embodiment illustrate in FIG. 2, weights are assigned either on a set basis or a random basis. However, in alternative embodiments, it is possible for weights to be assigned using a combination of set determinations (e.g., based on risk assessment) and random determinations. To cite just one example, a set number for a particular node could be added to whatever value is randomly determined for that node and the sum could be used as the Node Weight value. In this example, the set value might be based on current risk. For example, a weight determination function could provide that, for certain nodes, a node weight value is the sum of some set value, e.g., 0.5, plus whatever random value has been assigned to that node. In another example, set probability factors can be used to weight the outcome of a random selection function. For example, risk factors can be used to assign "pre-weights" for nodes based on risk that affect the outcome of a random selection function and the random selection function can generate a binary (e.g., 0, 1) result for determining whether to re-authenticate at each node, the probability of a node's selection for re-authentication corresponding to a "pre-weight." In such an example, a pre-weight of, for example 0.2, would be input into the random selection function so that the random selection function assigns a "1" to the node approximately 20% of the time. Riskier nodes might be assigned higher pre-weights, e.g., 0.8. Other variations are possible as will be apparent to one skilled in the art.

FIG. 3A is a block diagram 300 illustrating operation of set weight determination module 165 according to some embodiments of the present invention. Weight determination module 165 allocates a weight 395 for each non-modal node of client application 120. In some embodiments, weight determination module 165 dynamically allocates weights to each node of client transaction application 120a every time a user logs in. In some embodiments, weight determination module 165 allocates weights 395 by evaluating a number of factors, such as market conditions 361, user authentication data, and so on. In some embodiments, allocated weights 395 are stored for use in successive weight allocation events. In particular, in some embodiments, weight determination module 165 compares assigned weights 395 with stored weights to ensure that the overlap is not 100%.

In some embodiments, weight determination module 165 utilizes market conditions 361 in determining a risk level (and corresponding weight) associated with each node. Market conditions 361 may include, for example, history of attacks on particular nodes. Thus, as an example, if node 131 has been targeted frequently over the last 24 hours, node 131 may be assigned a higher weight than it was assigned 24 hours ago. Market conditions 361 may include sensitivity of information accessible at each node. The sensitivity of information accessible at each node may fluctuate over time, and therefore, can be a factor in assessing the risk level and corresponding weight for each node. Market conditions 361 may include recent attacks on similar products. Thus, as an example, if other medical records systems have been targeted by attackers, weights associated with one or more of the nodes 122-131 of medical records system (e.g., one implemented by system 100) may be correspondingly raised. Market conditions 361 may include macro-level conditions as well, such as terrorist alert levels. Thus, as an example, if product database 145 stores classified data, and a government threat level is raised (say from green to amber), weights associated with one or more of the nodes 122-131 may be correspondingly raised.

In some embodiments, weight determination module 165 may also utilize authentication data for a user (as may be stored in a user record 401, shown if FIG. 4, stored in user database 150 of FIG. 1) to determine a risk level associated with each node. Because a user's unique authentication data is taken into account in determining the weights 395, the weights 395 allocated to a node of client application 120a are unique to each user. This can lead to greater security because it reduces the likelihood that two users will experience authentication checks at the same nodes.

User authentication data may include one or more observed authentication data 381 that has been observed over time by server 140. Examples of observed authentication data include: geographic locations from which a user has previously accessed a resource through server 140, most recent geographic locations from which user has previously accessed a resource on server 140, times of day in which user has previously accessed a resource on server 140, a number of times (or a percentage of times) that user has correctly specified a password for a resource on server 140, types of prior transactions associated with user, and so on.

User authentication data may include real-time factors 391 associated with client device 110. A real-time factor includes a characteristic, quality or attribute of a client device 110 or user that is determined in real-time by server 140. Real-time factors 591 may include such factors as: a physical location (such as, a global positioning system (GPS) location) of client device 110, the medium by which the request is conveyed (such as a local area network versus remote access), a time of day in which client device 110 attempts to access the user's account, a time zone in which client device 110 attempts to access the user's account, a wireless fidelity (Wi-Fi) network that is accessed by client device 110 and/or is accessible to client device 110, a cellular carrier that provides network access to client device 110, a proximity of client device 110 to other devices (e.g., a device that has been identified to server 140), an image of a current user of client device 110 (e.g., detected by server 140 through facial recognition software on client device 110), the properties of the object (e.g., data) to which the request pertains, and the quality of the credentials already included with the request, and so on. As to the quality of the credentials, for example, if the credentials are for a user from another organization, then depending on the resource that the user is trying to access, additional credentials may be required.

In some embodiments, weight determination module 165 may execute one or more algorithms to determine the weights 395 in agreement with one or more rules 321 and based on one or more inputs, including the market condition data 361, observed authentication data 381 and the real time factors 391. In some embodiments, weight determination module 165 assigns a node an initial weight or base value of 0. Over time, based on the afore-mentioned factors, such as the market condition data 361, observed authentication data 381 and the real time factors 391, weight determination module 165 updates the base value for the weight of the node. For instance, in one example, if a significant amount of fraud traffic moves through that a certain node, weight determination module 165 updates the base value to 0.5 or more.

Rules 321 may be specified by an administrator, or alternatively or in addition, in some embodiments, weight determination module 165 may include one or more predictive models to determine one or more sets of recommended rules 321. A predictive model can take into account a large number of parameters. A predictive model may include one or more of neural networks, Bayesian networks (such as Hidden Markov models), expert systems, decision trees, collections of decision trees, support vector machines, or other systems known in the art for addressing problems with large numbers of variables. A predictive model may be trained on prior data and outcomes. The particular data parameters selected for analysis in the training process are determined by using regression analysis and/or other statistical techniques known in the art for identifying relevant variables in multivariate systems.

Thus, if user does something out of the ordinary based on observed authentication data 381 and real-time factors 391, weights 365 associated with one or more of the nodes 122-131 may be correspondingly raised. For example, if user always accesses resources on server 140 from California, but is suddenly attempting to access from China, weights associated with one or more of the nodes 122-131 may be correspondingly raised. As another example, if a real-time image of user does not match a stored image of user, weights associated with one or more of the nodes 122-131 may be correspondingly raised.

Figure 3B:
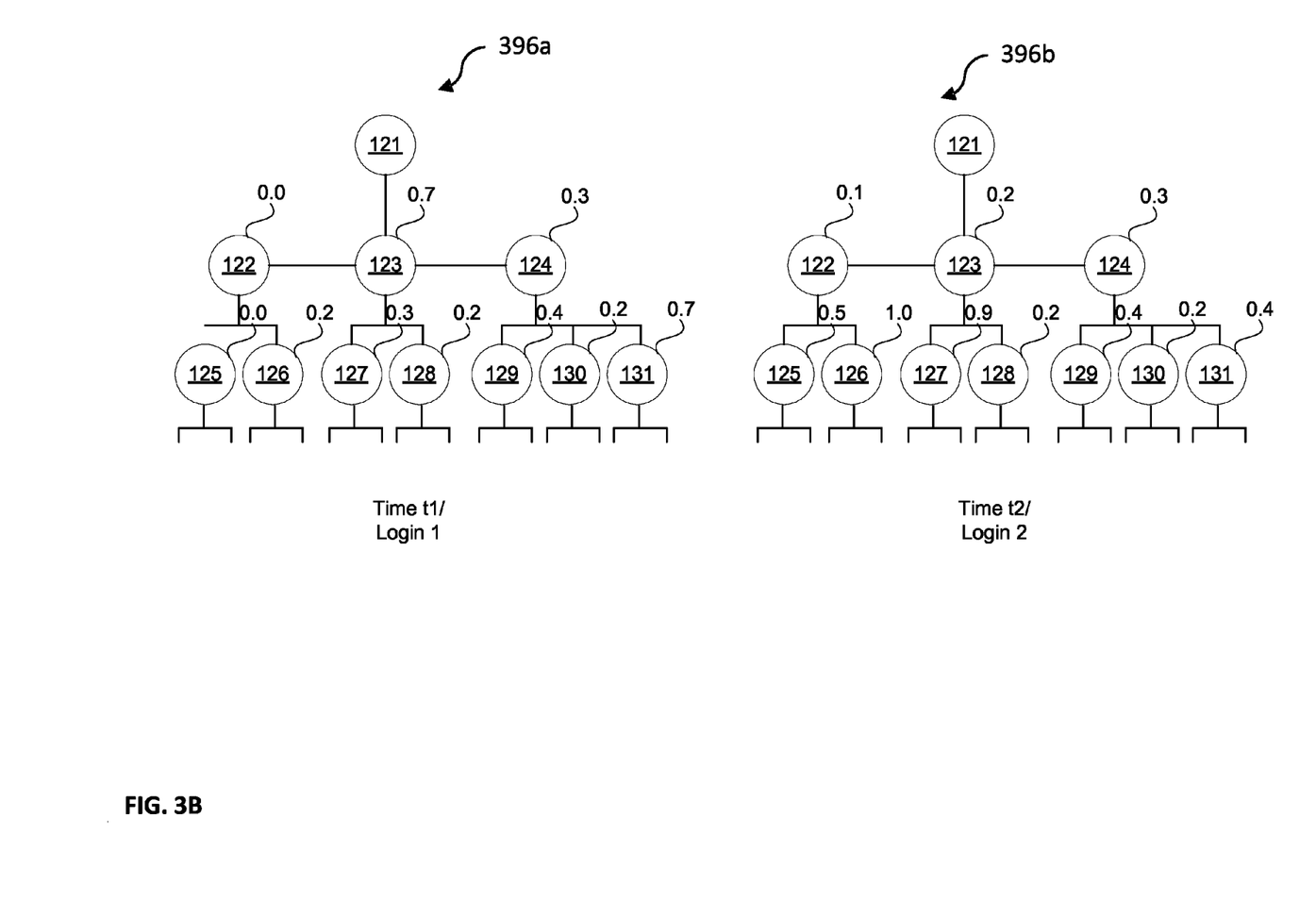
FIG. 3B illustrates an example of assigned weights for a set of nodes.

FIG. 3B also illustrates two examples of weights 396a and 396b assigned for nodes 122-131 at two different times for a user 105. In the illustrated example, at a first login (at time t1), weight determination module 165 assigns nodes 122-131 the following respective weights 396a: 0.0, 0.7, 0.3, 0.0, 0.2, 0.3, 0.2, 0.4, 0.2 and 0.7. At a subsequent login (at time t2), weight determination module 165 assigns nodes 122-131 the following respective weights 396b: 0.1, 0.2, 0.3, 0.5, 1.0, 0.9, 0.2, 0.4, 0.2 and 0.4. The differences in the assigned weights represent changes in one or more of: market conditions 361, observed authentication data 381 and real-time factors 391, as calculated for each node.

Figure 3C:
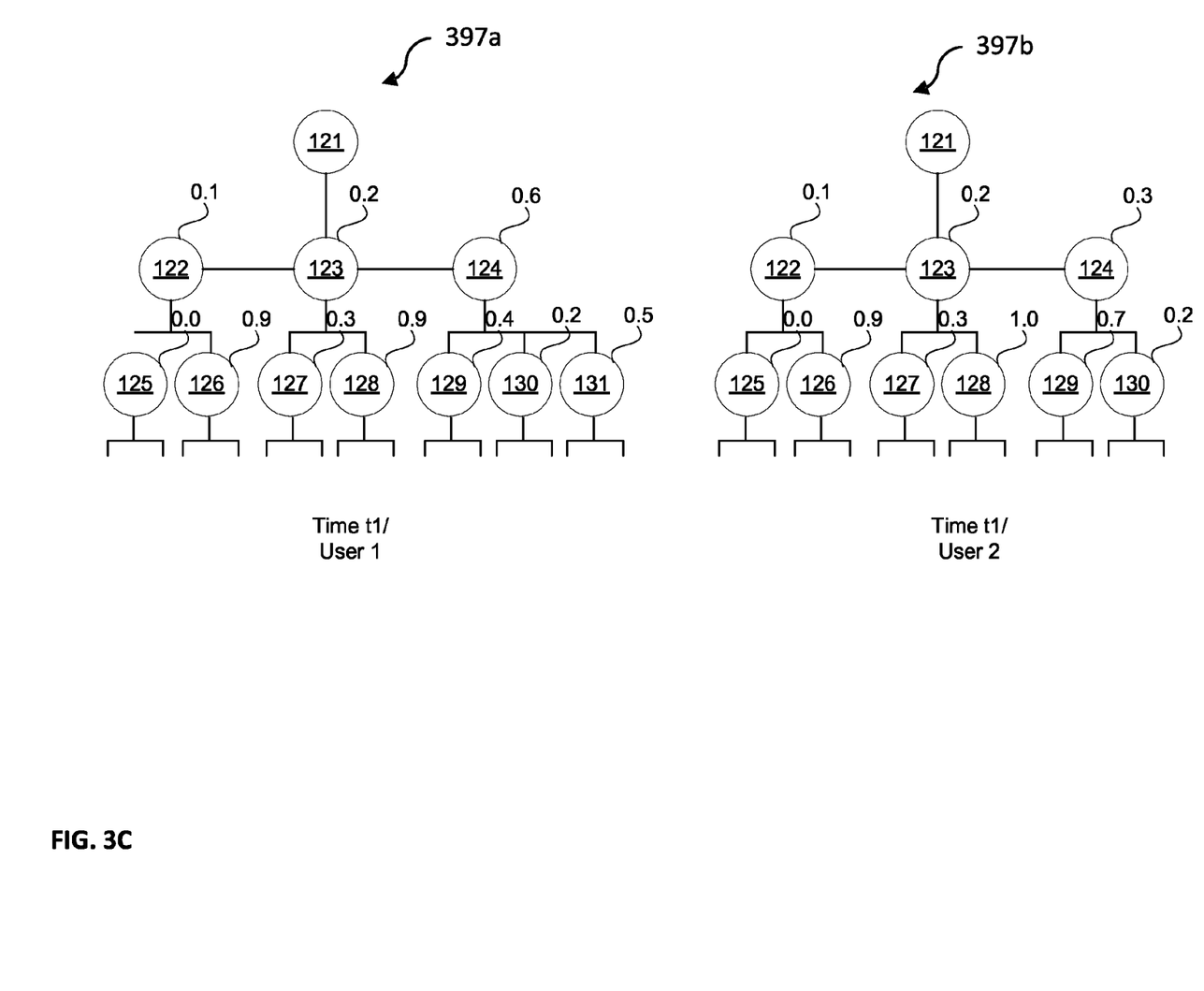
FIG. 3C illustrates an example of assigned weights for a set of nodes.

FIG. 3C illustrates two examples of weights 397a and 397b assigned for nodes 122-131 for two different users. In the illustrated example, when a first user logs in and gains access to entry point 121, weight determination module 165 assigns nodes 122-131 the following respective weights 397a: 0.1, 0.2, 0.6, 0.0, 0.9, 0.3, 0.9, 0.4, 0.2 and 0.5. When a second user logs in and gains access to entry point 121, weight determination module 165 assigns nodes 122-130 the following respective weights 397b: 0.1, 0.2, 0.3, 0.0, 0.2, 0.9, 0.3, 1.0, 0.7 and 0.2. The differences in the assigned weights represent differences in attributes of the two users. For example, the differences in the assigned weights may reflect changes in one or more of: market conditions 361, observed authentication data 381 and real-time factors 591, as calculated for each node for the two users. Note that the weights 397b are only assigned to nodes 122-130, reflecting the fact that in this example, the second user is only eligible to access nodes 122-130, and is ineligible to access node 131.

Figure 4:
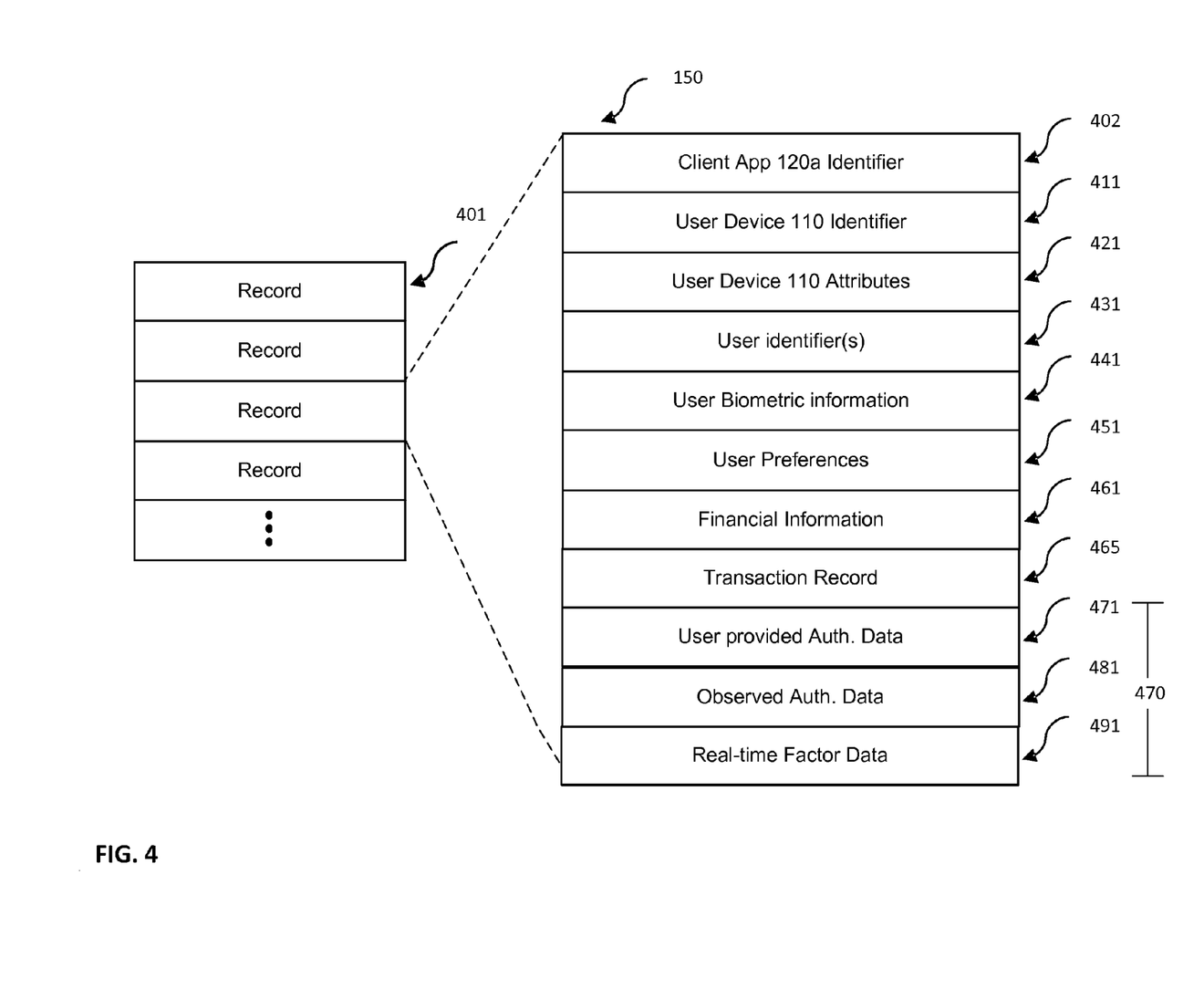
FIG. 4 is a block diagram of a database structure for storing user account data in accordance with certain embodiments of the present invention.

FIG. 4 is a block diagram of the structure of a user database 150 of FIG. 1 according to some embodiments of the present invention. Database 150 contains a set of user account records.

A respective user account record 401 may include such information as: (i) an identifier 402 that uniquely identifies the (instance of) client-side transaction application 120, (ii) a user device identifier 411 associated with the client device 110, such as a mobile phone number, an IDEN number, a MAC address, etc., (iii) attributes and capabilities 421 of the client device 110, (iv) one or more user identifiers 431 associated with the user (e.g., user's login user name and/or password, user's email login user name and/or password, user's account number and/or password, etc.), (v) user biometric information 441, such as thumbprint, image, etc., (vi) user preferences 451 (such as, mailing address, shipping address, preferred method of contact, etc.), (vii) private financial information 461 of the user, such as credit card information, bank information, or other financial information which may be used to facilitate online transactions by user, (vi) transaction records 465 (such as, transaction amounts, dates, etc.) associated with the user record 401, (vii) authentication data 470, which may include (a) one or more user-provided authentication data 471, which may include such data provided by user as mother's maiden name, name of first pet, birthplace, favorite vacation spot, etc., (b) one or more observed authentication data 481, and (c) real-time factors 491.

Figure 5:
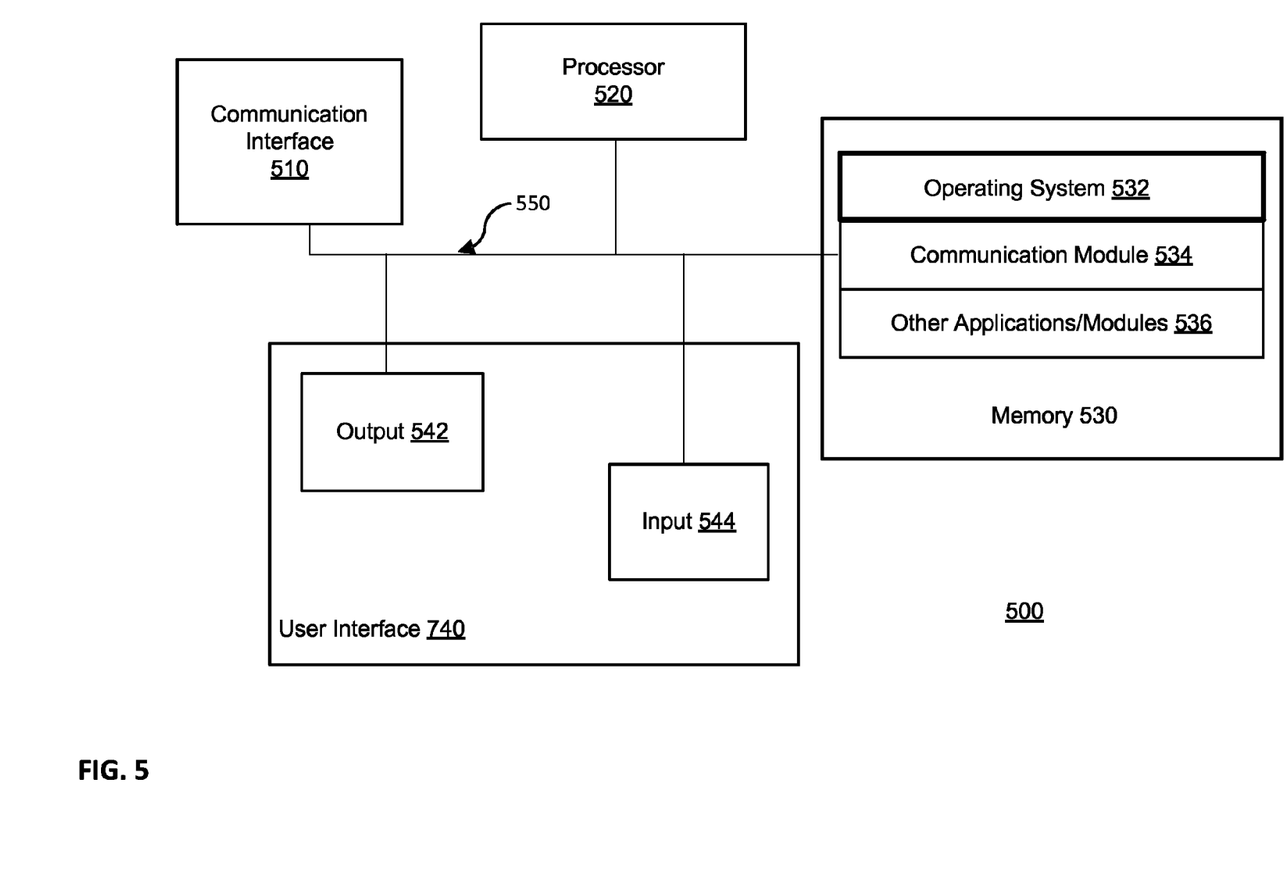
FIG. 5 is a block diagram of a computing device in accordance with certain embodiments of the present invention.

FIG. 5 is a block diagram of an exemplary computing device 500 in accordance with some embodiments of the present invention, which can be used as any one of client device 110 and/or server 140 (server 140 may, in alternative embodiments, be implemented with multiple server computers). In one embodiment computing device 500 typically includes one or more communications interfaces 510 (e.g., a network interfaces), one or more processors 520 (which may be central processing units (CPUs)), memory 530, user interface 540, and one or more communication buses 550 for interconnecting these components. The communication buses 550 may include circuitry (sometimes called a chipset) that interconnects and controls communications between system components.

User interface 540 includes an output device 542 (e.g., display) and an input device 544 (e.g., keyboard, touch screen). In one embodiment, output device 542 and input device 544 may be the same device, e.g., a touch screen that serves as both an input device and a display.

Memory 530, or one or more of the storage devices (e.g., one or more non-volatile storage devices) in memory 530, includes a computer readable storage medium. In some embodiments, memory 530 or the computer readable storage medium of memory 530 stores the following programs, modules and data structures, or a subset thereof: operating system 532, communication module 534, and other applications/modules 536. In one embodiment, operating system 532 includes procedures for handling various basic system services and for performing hardware dependent tasks. Also, in one embodiment, communication module 534 (e.g., a network communication module) is used for connecting computing device 500 to other computers via the one or more communication interfaces 510 and one or more communication networks, such as the Internet, other wide area networks, local area networks, metropolitan area networks, and so on. In case of client device 110, other applications/modules 536 may include a browser application 115 (shown in FIG. 1), client transaction application 120*a* (shown in FIG. 1—including client-side authentication module 160*a*), word processing application (not shown), etc. In case of server 140, other applications/modules 536 may include server-side authentication module 160*b* (shown in FIG. 1—including modules 162 and 165) and server-side transaction application 120*b* (shown in FIG. 1).

Memory 530 may include a high-speed random access memory, such as DRAM, SRAM, DDR RAM or other random access solid state memory devices. Memory 530 may also include non-volatile memory, such as one or more magnetic disk storage devices, optical disk storage devices, flash memory devices, or other non-volatile solid state storage devices. Although not illustrated, memory 530 may also include any data storage equipment accessible by device 500, such as any memory that is removable or portable, (e.g., flash memory or external hard disk drives), or any data storage hosted by a third party (e.g., cloud storage), and is not limited thereto.

As noted above, memory 530 is a computer readable medium, more specifically a tangible computer readable medium. Computer programs on memory 530, when executed on computing device(s) or computer(s), cause the computing device(s) or computer(s) to perform embodiments of the methods of the present invention. Computer programs may also be referred to by various other names, such as, for example, computer applications, computer program modules, computer program code, computer readable code, computer executable code, computer program instructions, applet interpreters or compilers, virtual machines, etc. In one embodiment, the computer readable medium can be distributed over a network-coupled computer system so that the computer readable code is stored and executed in a distributed fashion. It is to be noted that any or all steps of the embodiments of the methods of the present invention can be computer implemented. It is also to be noted that the above examples of computer readable media are examples of non-transitory computer readable media. Further, computer instruction signals may be embodied in a transmission medium (with or without a carrier wave upon which the signals are modulated). For example, the transmission medium may include a communications network, such as the Internet.

It is to be noted that computing device 500 is only exemplary and a large variety of computer configurations may be suitable for implementing embodiments of the present invention. Furthermore, it is to be noted that computing device 500 illustrated in FIG. 5 is a simplified version of a computing device. Accordingly, some details of computing device 500 that are known in the art have been left out of FIG. 1 so as not to unduly overcomplicate the drawing.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

What is claimed is:

1. A method of selectively enabling access to functions of a transaction application requested by a user of a client electronic device, the transaction applications respectively corresponding to application nodes, the method comprising:

authenticating, using one or more server computers, the user for access to an entry point of the transaction application;

making a determination, using one or more server computers, whether to require re-authentication of the user for access to an application node other than the entry point, wherein:

(1) making the determination comprises executing a random weight determination module to assign a randomly generated respective weight value to each of a plurality of application nodes that would not otherwise require authentication; and (2) as the user traverses one or more of the plurality of application nodes, comparing a sum of at least one respective weight value of the traversed application nodes, wherein the traversed application nodes include the application node currently being traversed, to a threshold value to determine whether re-authentication of the user is required prior to granting access to the function of the transaction application corresponding to the currently traversed application node; and if the determination indicates that re-authentication of the user is required prior to granting access to a function of the transaction application corresponding to the application node, requiring re-authentication of the user if the user attempts to traverse the application node.

2. The method of claim 1 wherein the assigned respective weight value is either a value corresponding to a threshold value or a value corresponding to a non-threshold value wherein comparing the sum further comprises:

if the assigned weight value of the currently traversed application node corresponds to the threshold value, then the determination indicates that re-authentication is required for the currently traversed application node prior to granting access to the function of the transaction application corresponding to the currently traversed application node.

3. The method of claim 1 wherein the assigned respective weight value is a value equal to or between a value corresponding to a threshold value and a value corresponding to a non-threshold value, wherein comparing the sum further comprises:

incrementing the sum by the assigned respective weight value of a traversed application node upon traversal and, if the sum after being incremented is equal to or greater than the threshold value, then the determination indicates that re-authentication is required for the traversed application node prior to granting access to the function of a transaction application corresponding to the currently traversed application node.

4. The method of claim 1 wherein requiring re-authentication of the user comprises:
requesting one or more device-generated credentials to be checked prior to granting the user access to the function of a transaction application.

5. The method of claim 4 wherein the one or more device-generated credentials are generated by the client electronic device without requiring additional input from the user other than a user-interface action corresponding an attempt to traverse the application node.

6. The method of claim 1 wherein the transaction application is stored and executed on the client electronic device.

7. The method of claim 1 wherein the transaction application is stored and executed on one or more server computers.

8. The method of claim 1 wherein a first portion of the transaction application is stored and executed on the client electronic device and a second portion of the transaction application is stored and executed on one or more server computers.

9. A computer program product embedded in a non-transitory computer readable medium including instructions executable by a computer processor to selectively require authentication of a user of a client electronic device for access to functions corresponding to application nodes of a transaction application by:
authenticating the user for access to an entry point of the transaction application;
making a determination whether to require re-authentication of the user for access to an application node other than the entry point wherein making the determination comprises:
(1) executing a random weight determination module to assign a randomly generated respective weight value to each of a plurality of application nodes that would not otherwise require authentication; and
(2) as the user traverses one or more of the plurality of application nodes, comparing a sum of at least one respective weight value of the traversed application nodes, wherein the traversed application nodes include the application node currently being traversed, to a threshold value to determine whether re-authentication of the user is required prior to granting access to the function of the transaction application corresponding to the currently traversed application node; and
if the determination indicates that re-authentication of the user is required prior to granting access to the function of the transaction application corresponding to the application node, requiring re-authentication of the user if the user attempts to traverse the application node.

10. The computer program product of claim 9 wherein the assigned weight value is either a value corresponding to a threshold value or a value corresponding to a non-threshold value wherein, comparing the sum further comprises:
if the assigned weight value of the currently traversed application node corresponds to the threshold value, then the determination indicates that re-authentication is required for the currently traversed application node prior to granting access to the function of the transaction application corresponding to the currently traversed application node.

11. The computer program product of claim 9 wherein the assigned respective weight value is a value equal to or between a value corresponding to a threshold value and a value corresponding to a non-threshold value, wherein comparing the sum further comprises:
incrementing the sum by the assigned respective weight value of a traversed application node upon traversal and, if the sum after being incremented is equal to or greater than the threshold value, then the determination indicates that re-authentication is required for the traversed application node prior to granting access to the function of a transaction application corresponding to the currently traversed application node.

12. The computer program product of claim 9 wherein requiring re-authentication of the user comprises:
requesting one or more device-generated credentials to be checked prior to granting the user access to the function of a transaction application.

13. The computer program product of claim 12 wherein the one or more device-generated credentials are generated by the client electronic device without requiring additional input from the user other than a user-interface action corresponding to an attempt to traverse the application node.

14. The computer program product of claim 9 wherein the transaction application is stored and executed on the client electronic device.

15. The computer program product of claim 9 wherein the transaction application is stored and executed on one or more server computers.

16. The computer program product of claim 9 wherein a first portion of the transaction application is stored and executed on the client electronic device and a second portion of the transaction application is stored and executed on one or more server computers.

* * * * *